Nov. 7, 1933.  D. E. LINDQUIST ET AL  1,933,915
JOINT
Filed July 2, 1931
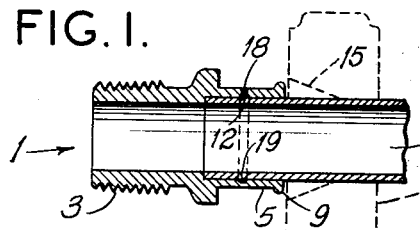
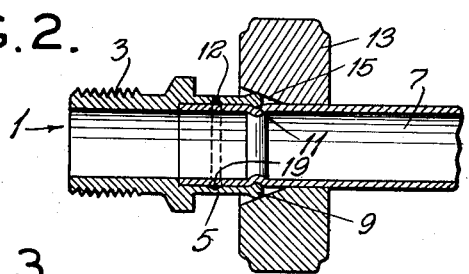
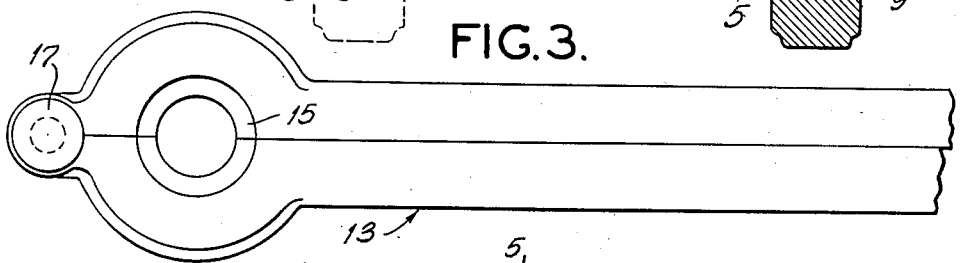
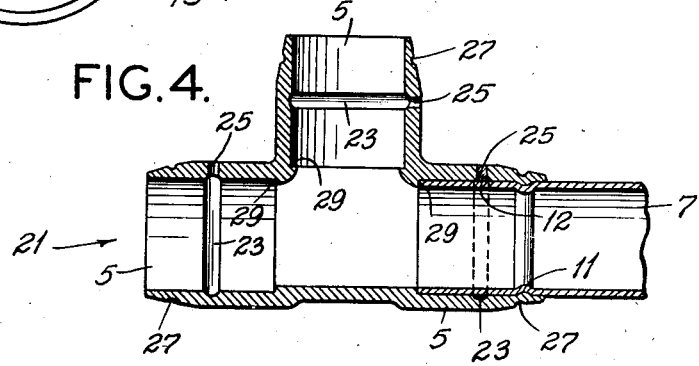
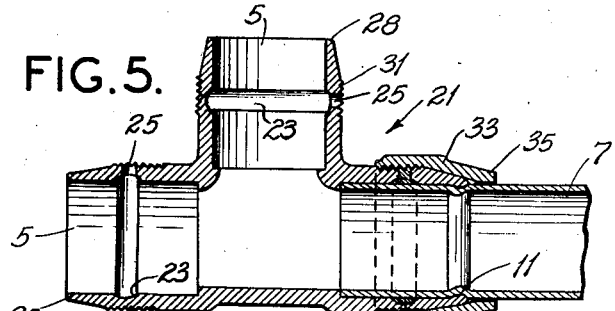
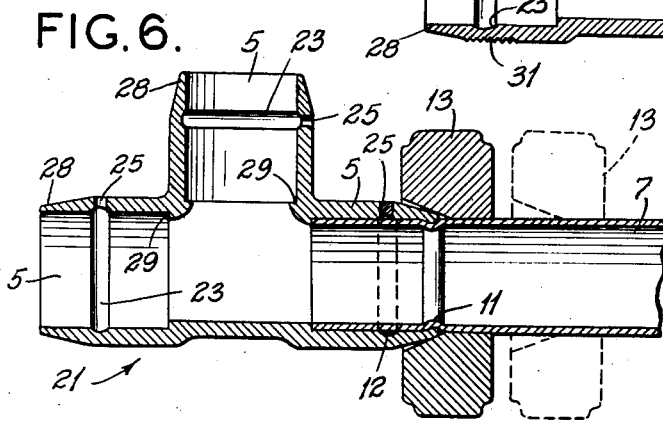
David E. Lindquist,
Ward M. Robinson,
Inventors.
Delos G. Haynes,
Attorney.

Patented Nov. 7, 1933

1,933,915

UNITED STATES PATENT OFFICE 1,933,915

JOINT

David E. Lindquist and Ward M. Robinson, Port Huron, Mich., assignors to Mueller Brass Co., Port Huron, Mich., a corporation of Michigan Application July 2, 1931. Serial No. 548,280

3 Claims. (Cl. 285—115)

This invention relates to joints and with regard to certain more specific features to lock joints for joining conduits.

Among the several objects of the invention may be noted the provision of a lock joint performed between a coupling and a conduit or the like without the use of threads between said coupling and conduit; the provision of a joint of the class described which may be completed in a substantially fluid-tight condition with or without the use of sealing material; the provision of a joint of the class described which is permanently formed and which is adapted to join a conduit formed from relatively soft metal to a fitting of relatively hard metal; and the provision of a joint of this class which is simple to complete and which is adapted to retain its strength at relatively high temperature. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which are illustrated several of various possible embodiments of the invention, Fig. 1 is an axial section of a fitting employing one modification of the invention and showing a tool in dotted line in position to lock said fitting to a pipe;

Fig. 2 is a view similar to Fig. 1 but showing the pipe anchored to said fitting and said tool forcibly applied to said fitting;

Fig. 3 is an elevation of a tool adapted to be used with the fitting of Figs. 1 and 2;

Fig. 4 is an axial section of a fitting employing a modification of the invention;

Fig. 5 is a view similar to Fig. 4 showing another modification of the invention; and, Fig. 6 is a view similar to Fig. 4 showing a fourth modification of the invention.

Similar reference characters indicate corresponding parts throughout the several views of the drawing.

Referring now more particularly to Fig. 1 there is shown at numeral 1 a fitting for joining pipes, conduit or the like, said fitting having a heavy threaded portion 3 at one end thereof, and a lighter receiving portion 5 at the other end thereof. The receiving portion 5 is adapted to telescopingly receive a pipe or conduit 7, and the spacing originally between said pipe 7 and receiving portion 5 is of the order of magnitude to induce capillary flow of sealing material introduced therebetween, as described in detail in the United States Patent 1,770,852, issued July 15, 1930, to Charles Hill.

Formerly joints accomplished between the receiving portion 5 of the fitting 1 and a pipe 7, and in which sealing material was introduced between the receiving portion 5 and pipe 7, could not be used in instances where the temperature surrounding the fitting was in the range of the fusing point of the sealing material thus used because at that temperature the joint lost its strength. However, in some instances such a fluid-tight and strong joint was necessary in places where the temperature was in the range of the fusing point of the sealing material. The present invention provides such a joint which may be entirely performed with or without use of any sealing material, and whose strength is substantially independent of the sealing material.

In order to effect a joint which is fluid-tight with or without the use of sealing material, and which also has a relatively large mechanical strength between the pipe 7 and the fitting 1, we provide an integral annular bead 9 at the outermost end of the receiving portion 5.

After the pipe 7 has been telescoped into the receiving portion 5, the bead 9 is compressed or radially forced inwardly to the extent that the material of the inserted pipe 7 is also displaced inwardly to form a bead 11 substantially as shown in Fig. 2. One way to accomplish this radial compression of the bead 9 is with a tool 13 which comprises two semi-circular pieces, hinged together as shown at numeral 17, and which may be locked together around the pipe 7. In the locked position, the pieces provide a tapered bore which is adapted to partially receive the bead 9. The tool 13 thus placed over the pipe 7 is hammered against the fitting 5, or the fitting 5 is hammered against the tool 13, and the bead 9 thus forced into the tapered bore 15 is circumferentially depressed or forced into the pipe 7 to provide the interlocking beads 11 in the fitting and pipe.

It is thus seen that not only is a substantially fluid-tight joint provided between the pipe 7 and the receiving portion 5, but also a joint is provided by which the pipe 7 is positively locked in the receiving portion 5. Furthermore, the joint thus formed is substantially unaffected by temperatures below the actual fusing point of the metals forming the joint.

The bead 9 may also serve to guide a tool applied to said fitting 1 to roll a groove into the fitting 1 to form a bead 11 in the portion back of said bead 9. Further, the exact method of depressing the bead 9 is not limited to that shown and may for instance comprise circumferentially rolling said bead 9 to radially compress it or otherwise treating it.

The receiving portion 5 is also provided with a groove 19, and a hole 18 communicating with said groove and the exterior of the receiving portion 5, in order that sealing material 12 may be introduced between the fitting 5 and the telescoped pipe 7, to further enhance the efficiency of the joint. The sealing material thus introduced is spread around the area between the fitting and pipe by means of the capillary action as described in the aforementioned patent to Hill. However, the use of the sealing material is optional, and instances in which the fitting is used at temperatures which are above the fusing point of the sealing material 12 the sealing material will probably not be used.

An advantage of the joint thus formed is that a fitting such as shown at numeral 1 may be employed for use in connection with a drip pipe of a range boiler, but it is to be understood that the type of fitting shown in Figs. 1 and 2 is by way of example only, and that a joint comprising the sealing portion 5 and the integral annular bead 9 may be formed with any suitable type of fitting.

Another advantage of this modification of the fitting and joint is the ease with which it is performed by the tool 13.

Referring now more particularly to the modification shown in Fig. 4 there is shown at numeral 21 a fitting which by way of example comprises a T-fitting adapted to connect tubing without the use of threads between the fitting and tubing. The fitting has receiving portions 5 which are long and tapered at the ends and which are adapted to telescopingly receive the piping 7. As before, the spacing between receiving portion 5 and the entering pipe 7 is of the order of magnitude to induce capillary flow of sealing material introduced therebetween. Each receiving portion 5 is provided with an inner circumferential groove 23, which communicates with the exterior of the fitting by a hole 25. The exterior of each receiving portion is also provided with a circumferential groove 27, which is provided in the fitting 21 in the place of the bead 9 of the fitting 1 of Figs. 1 and 2.

The assembly of the joint comprising the fitting 21 and the pipe 7 is as follows:

Piping 7 is inserted into a receiving portion of the fitting 21, until it abuts an inner edge 29, and the fitting 21 is heated and a sealing material 12 is applied to the hole 25, which sealing material runs around the groove 23, and spreads by said aforementioned capillary action between the pipe 7 and receiving portion 5 thereby providing, upon cooling, a positive fluid-tight seal therebetween and also a bond between said fitting and pipe 7 which has a relatively large degree of mechanical strength. However, if such a joint is to be used in instances where the temperature is likely to rise above or equal to that of the fusing point of the sealing material or if the joint is to be subjected to unusual stresses the joint is strengthened by radially pressing the portion of the fitting 21 comprising the groove 27 into the pipe 7 to form interlocking beads 11. This operation provides a separate mechanical hold, independent of any sealing material, between said pipe 7 and fitting 21.

Referring now more particularly to the modification shown in Fig. 5 there is shown at numeral 21 a fitting which is similar to that shown in Fig. 4, but which has threaded portions 31 instead of the exterior grooves 27. A threaded collar 33, having a tapered bore, is also provided and is adapted to spread onto the threaded portion 31. The ends 28 of the receiving portion 5 are tapered as shown in Fig. 5.

The assembly of a joint comprising the fitting 21 of Fig. 5 and a pipe 7 is as follows:

The collar 33 is passed over the pipe 7 which is then telescoped into and soldered to the fitting 21, as described in connection with Fig. 4. The collar 33 is now threaded onto the exterior of the fitting 21 by means of the threads 31, and a portion 35 of the collar 33 reacts against the tapered end 28 of the fitting 21, and presses the end 28 into pipe 7 to form a bead 11. It is thus seen that a positive holding means is provided between the pipe 7 and the fitting 21 even in the event that the sealing material 12 between the fitting 21 and the pipe 7 becomes melted or otherwise ineffective.

An advantage of this modification of the invention is that no tool other than a wrench is required to form the holding groove or bead 11 in the pipe 7.

Referring now more particularly to the modification shown in Fig. 6, the fitting 21 shown is similar to the fitting of Figs. 4 and 5 except for the fact that the groove 27 and the threaded portion 31 are omitted, and in this modification the bead 11 is formed in the pipe 7 by hammering the tool 13 against the tapered portion 28 thereby forcing the portion 28 into the pipe 7. The modification of Fig. 6 is applicable in cases where a pounding action against the fitting 21 is possible.

A general advantage of the invention is the additional strength given to the joint by anchoring the pipe and fitting together with the beads 11.

It is to be understood that the shape and type of fitting shown in the drawing is by way of example only and any type of fitting may be employed. Thus the interior of the receiving portion 5 might be threaded to receive an inserted pipe 7 and the bead 11 formed in the pipe by indentation of the receiving portion 5 in order to lock the two against unthreading. Further any type of sealing material may be employed between the fitting and the pipe 7 and may be metallic or nonmetallic and may or may not provide a fluid-tight seal, as well as a binding or holding seal.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

We claim:

1. A joint comprising a fitting having a receiving portion, and a pipe entering said portion, the spacing between said fitting and pipe being of the order of magnitude to induce capillary flow of sealing material introduced therebetween, the receiving portion of said fitting being circumferentially deformed to provide a bead adapted to interlock with a groove in said pipe.

2. A joint comprising a fitting having a receiving portion, and a pipe entering said portion, the spacing between said fitting and said pipe being of the order of magnitude to induce capillary flow of a sealing material introduced therebetween, said receiving portion having an exterior annular bead formed thereon, said bead being adapted to be deformed to provide an interior annular bead adapted to interlock with a groove in said pipe.

3. A joint comprising a fitting having a receiving portion, and a pipe entering said portion, the spacing between said fitting and said pipe being of the order of magnitude to induce capillary flow of a sealing material introduced therebetween, said receiving portion having an exterior groove therearound adapted to guide a tool whereby said portion is circumferentially deformed to provide a bead adapted to interlock with a groove in said pipe.

DAVID E. LINDQUIST.
WARD M. ROBINSON.